Oct. 30, 1945.   A. H. BENNETT   2,388,031
OPTICAL SYSTEM
Filed Oct. 28, 1943
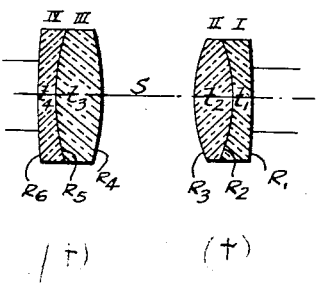
INVENTOR.
ALVA H. BENNETT.
BY Raymond A. Paquin
ATTORNEY Patented Oct. 30, 1945

2,388,031

UNITED STATES PATENT OFFICE 2,388,031

OPTICAL SYSTEM

Alva H. Bennett, Kenmore, N. Y., assignor, by mesne assignments, to American Optical Company, Southbridge, Mass., a voluntary association Application October 28, 1943, Serial No. 508,025

2 Claims. (Cl. 88—57)

This invention relates to optical systems and more particularly to a new and improved optical system for use in an ocular for a projection optical measuring instrument.

An object of the invention is to provide a new and improved optical system of the type set forth which is corrected for lateral color, astigmatism and curvature of field and distortion.

Other objects and advantages of the invention will be apparent from the following description taken in connection with the accompanying drawing. Many changes may be made in the details of construction and arrangement of parts without departing from the spirit of the invention as expressed in the accompanying claims. I, therefore, do not wish to be limited to the exact details of construction and arrangement of parts shown and described as the preferred form has been given by way of illustration only.

Referring to the drawing:

The single figure is a sectional view of an optical system embodying the invention.

In the construction of an optical system for use as an ocular of a projection optical measuring instrument it is desirable that such system be corrected for lateral color and also that such system be corrected for astigmatism over the greater portion of the field and corrected for curvature of field at the edge of the field as well as corrected for distortion in order that the projected image of the object will retain the true shape of the object for measurement purposes.

It is, therefore, the object of the present application to provide an optical system for the purpose set forth and which optical system provides all of these desirable features.

Referring more particularly to the drawing, the optical system comprises two cemented doublets. The front doublet consists of the elements I and II and the rear doublet consists of the elements III and IV.

The axial separation S between the two doublets is approximately 16.00 mm.

The radius of the front surface $R_1$ of the element I which is the surface nearest the screen is approximately —69.82 mm. and the radius of the surfaces $R_2$ is approximately —16.48 mm. and the axial thickness $t_1$ of the element I approximately 2.0 mm.

The radius of the rear surface $R_3$ of the element II is approximately +16.48 mm. and the axial thickness $t_2$ of said element approximately 4.0 mm.

The radius of the front surface $R_4$ of the element III is approximately —26.69 mm. and the axial thickness $t_3$ of said element is approximately 5.0 mm. The radius of the surfaces $R_5$ is approximately +23.60 mm. and the radius of the rear surface $R_6$ of the element IV is approximately +77.42 mm., and the axial thickness $t_4$ 2.0 mm.

In designating the sign of the radii in the above description the following conventional method has been followed.

A radius of curvature is considered positive if the direction from the vertex of the surface to the center of curvature is in the same direction as that of the transmission of light along the axis of the system. The radius of curvature is considered negative if the direction from the vertex of the surface to the center of curvature is in the opposite direction to that of the transmission of light along the axis of the system.

The elements I and IV are of an extra dense flint glass having a refractive index of approximately 1.72 and an Abbe number of approximately 29.3.

The elements II and III are of a spectacle crown glass having a refractive index of approximately 1.52 and an Abbe number of approximately 58.5.

The optical system described above has been found to be very well corrected for distortion as the distortion is zero at the edge of the field and the distortion at intermediate portions of the field is very small with a maximum distortion of .1 mm. for yellow while it is even less than that figure for blue and red.

The above computations are given for a lens system of 10X magnification. It will be understood that the invention also may be embodied in systems having other than 10X magnification by ratioing the figures given above to a system of desired magnification.

From the above it will be seen that the optical system set forth is exceedingly well designed for use as an ocular for an optical projection measuring instrument and that said optical system provides all of the desired advantages required by such a system, as set forth above. It will therefore be seen that I have provided a simple, efficient and economical construction for obtaining all of the objects and advantages of the invention.

Having described my invention, I claim:

1. In an optical system of the type set forth, a pair of doublets, each of said doublets consisting of a divergent element of extra dense flint glass having a refractive index of approximately 1.72 and an Abbe number of approximately 29.3 and a convergent element of spectacle crown glass having a refractive index of approximately 1.52 and an Abbe number of approximately 58.5, the radius of the front surface of the first element being approximately −69.82 mm., the radius of the rear surface of the first element and the first surface of the second element being approximately −16.48 mm., the radius of the rear surface of the second element being approximately +16.48 mm., the radius of the front surface of the third element being approximately −26.69 mm., the radius of the rear surface of the said third element and the front surface of the fourth element being approximately +23.60 mm. and the radius of the rear surface of the fourth element being approximately +77.42 mm., the axial thickness of said first element being approximately 2.0 mm., the axial thickness of said second element approximately 4.0 mm., the axial thickness of the third element approximately 5.0 mm. and the axial thickness of the fourth element approximately 2.0 mm. or a ratio thereof depending upon the magnification desired in the optical system, the above computations giving a magnification of 10X.

2. In an optical system of the type set forth, a pair of doublets, each of said doublets consisting of a divergent element of extra dense flint glass having a refractive index of approximately 1.72 and an Abbe number of approximately 29.3 and a convergent element of spectacle crown glass having a refractive index of approximately 1.52 and an Abbe number of approximately 58.5, the radius of the front surface of the first element being approximately −69.82 mm., the radius of the rear surface of the first element and the first surface of the second element being approximately −16.48 mm., the radius of the rear surface of the second element being approximately +16.48 mm., the radius of the front surface of the third element being approximately −26.69 mm., the radius of the rear surface of the said third element and the front surface of the fourth element being approximately +23.60 mm. and the radius of the rear surface of the fourth element being approximately +77.42 mm., the axial thickness of said first element approximately 2.0 mm., the axial thickness of said second element approximately 4.0 mm., the axial thickness of the third element approximately 5.0 mm. and the axial thickness of the fourth element approximately 2.0 mm. and the axial separation of said doublets being approximately 16.00 mm. or a ratio thereof depending upon the magnification desired in the optical system the above computations giving a magnification of 10X.

ALVA H. BENNETT.